United States Patent [19]

Sakurai et al.

[11] Patent Number: 4,628,882
[45] Date of Patent: Dec. 16, 1986

[54] FUEL SUPPLY CONTROL METHOD FOR MULTICYLINDER INTERNAL COMBUSTION ENGINES DURING OCCURRENCE OF ABNORMALITY IN ENGINE ROTATIONAL ANGLE POSITION SENSING MEANS

[75] Inventors: Hidetoshi Sakurai, Kawagoe; Masahiko Yakuwa, Fujimi, both of Japan

[73] Assignee: Honda Giken Kogyo K.K., Tokyo, Japan

[21] Appl. No.: 779,216

[22] Filed: Sep. 23, 1985

[30] Foreign Application Priority Data

Sep. 25, 1984 [JP] Japan .............................. 59-198457

[51] Int. Cl.$^4$ .......................................... F02M 51/00
[52] U.S. Cl. ................................. 123/479; 123/478; 123/490; 123/491
[58] Field of Search ................ 123/479, 478, 490, 491

[56] References Cited

U.S. PATENT DOCUMENTS

| | | | |
|---|---|---|---|
| 4,370,962 | 2/1983 | Hosaka ................................. | 123/479 |
| 4,459,961 | 7/1984 | Nishimura et al. .................. | 123/478 |
| 4,476,830 | 10/1984 | Hasegawa et al. ................... | 123/479 |
| 4,502,446 | 3/1985 | Kanegae et al. ..................... | 123/479 |
| 4,531,490 | 7/1985 | Kishi et al. .......................... | 123/479 |

FOREIGN PATENT DOCUMENTS 0197452  11/1983  Japan .................................. 123/479

Primary Examiner—Raymond A. Nelli
Attorney, Agent, or Firm—Arthur L. Lessler

[57] ABSTRACT

Fuel injections are sequentially effected into cylinders of a multicylinder internal combustion engine in predetermined sequence in synchronism with pulses of a predetermined crank angle position signal from engine rotational angle sensing means. If no TDC signal pulse is generated between an immediately preceding pulse and a present pulse of a cylinder-discriminating signal, a simultaneous fuel injections are effected into all the engine cylinders upon generation of the present pulse of the cylinder-discriminating signal. Preferably, the engine rotational angle sensing means is determined to be abnormal when the simultaneous fuel injections have been effected consecutively a predetermined number of times.

6 Claims, 5 Drawing Figures

FUEL SUPPLY CONTROL METHOD FOR MULTICYLINDER INTERNAL COMBUSTION ENGINES DURING OCCURRENCE OF ABNORMALITY IN ENGINE ROTATIONAL ANGLE POSITION SENSING MEANS

BACKGROUND OF THE INVENTION

This invention relates to a fuel supply control method for multicylinder internal combustion engines, which effects sequential fuel injections into cylinders of the engine in synchronism with pulses of a signal indicative of predetermined crank angles of the engine from engine rotational angle sensing means, and more particularly to a fuel supply control method of this kind, which is adapted to continue the engine operation by preventing engine stalling in the event of abnormality in the engine rotational angle sensing means.

A fuel supply control method for multicylinder internal combustion engines has generally been employed, which determines the fuel injection timing into each of cylinders of the engine with reference to pulses of a cylinder-discriminating signal (hereinafter called "the CYL signal pulses") generated by a cylinder-discriminating sensor (hereinafter called "the CYL sensor") at a predetermined crank angle of a particular one of the engine cylinders as well as pulses of a crank angle position signal (hereinafter called "the TDC signal pulses") generated by an engine rotation sensor (hereinafter called "the Ne sensor") at predetermined crank angles of the engine corresponding to respective cylinders of the engine, and injects required amounts of fuel through fuel injection valves in accordance with the fuel injection timing thus determined.

According to this fuel supply control method, in order to ensure smooth operation of the engine, it is an essential requisite that the CYL signal pulses and the TDC signal pulses, which determine the timing of fuel injection into each cylinder of the engine, should be accurately generated in proper sequence. In multi-cylinder engines in general, when the cylinder-discriminating signal detecting system (hereinafter called "the CYL detecting system") and the engine rotational angle detecting system (hereinafter called "the Ne detecting system") are in normally operative states, an injection of fuel is effected into a cylinder #1 upon generation of a pulse of the TDC signal immediately following a pulse of the CYL signal, followed by sequential fuel injections into cylinders #3, #4, and #2 in the mentioned order, upon generation of respective subsequent pulses of the TDC signal sequentially generated. Thereafter, a fuel injection is again effected into the cylinder #1 upon generation of a pulse of the TDC signal immediately following a pulse of the CYL signal which immediately follows the pulse of the TDC signal corresponding to the last cylinder #2. In this sequence, sequential fuel injections into the cylinders #1–#4 are repeated.

However, in the event of the occurrence of an abnormality in the Ne detecting system such that TDC signal pulses are not generated at the aforementioned predetermined crank angles of the engine, sequential fuel injections into the engine cylinders cannot be effected in a proper manner, even causing engine stalling.

SUMMARY OF THE INVENTION

It is an object of the invention to provide a fuel supply control method for internal combustion engines, which enables the engine to continue operating even while engine rotational angle position sensing means is out of order, by effecting simultaneous fuel injection into all of the cylinders.

According to the invention, there is provided a method of injecting fuel into cylinders of a multicylinder internal combution engine, having cylinder-discriminating means for generating a pulse of a cylinder-discriminating signal each time a predetermined crank angle position of a particular one of the cylinders is assumed, and engine rotational angle sensing means for generating a pulse of a crank angle position signal each time a predetermined crank angle position of each of the cylinders is assumed, in predetermined sequence starting with a predetermined cylinder corresponding to a first pulse of the crank angle position signal generated after each pulse of the cylinder-discriminating signal and in synchronism with pulses of the crank angle position signal.

The method of the invention is characterized by the following steps: determining whether or not a pulse of the crank angle position signal has been generated between an immediately preceding pulse and a present pulse of the cylinder-discriminating signal; and when no pulse of the crank angle position signal has been generated between an immediately preceding pulse and a present pulse of the cylinder-discriminating signal, effecting simultaneous fuel injections into all the cylinders of the engine upon generation of the present pulse of the cylinder-discriminating signal.

Preferably, the engine rotational angle sensing means is determined to be abnormal when the simultaneous fuel injections have been effected consecutively a predetermined number of times.

The above and other objects, features and advantages of the invention will be more apparent from the ensuing detailed description taken in connection with the accompanying drawings.

DETAILED DESCRIPTION

The invention will now be described with reference to the drawings.

Figure 1:
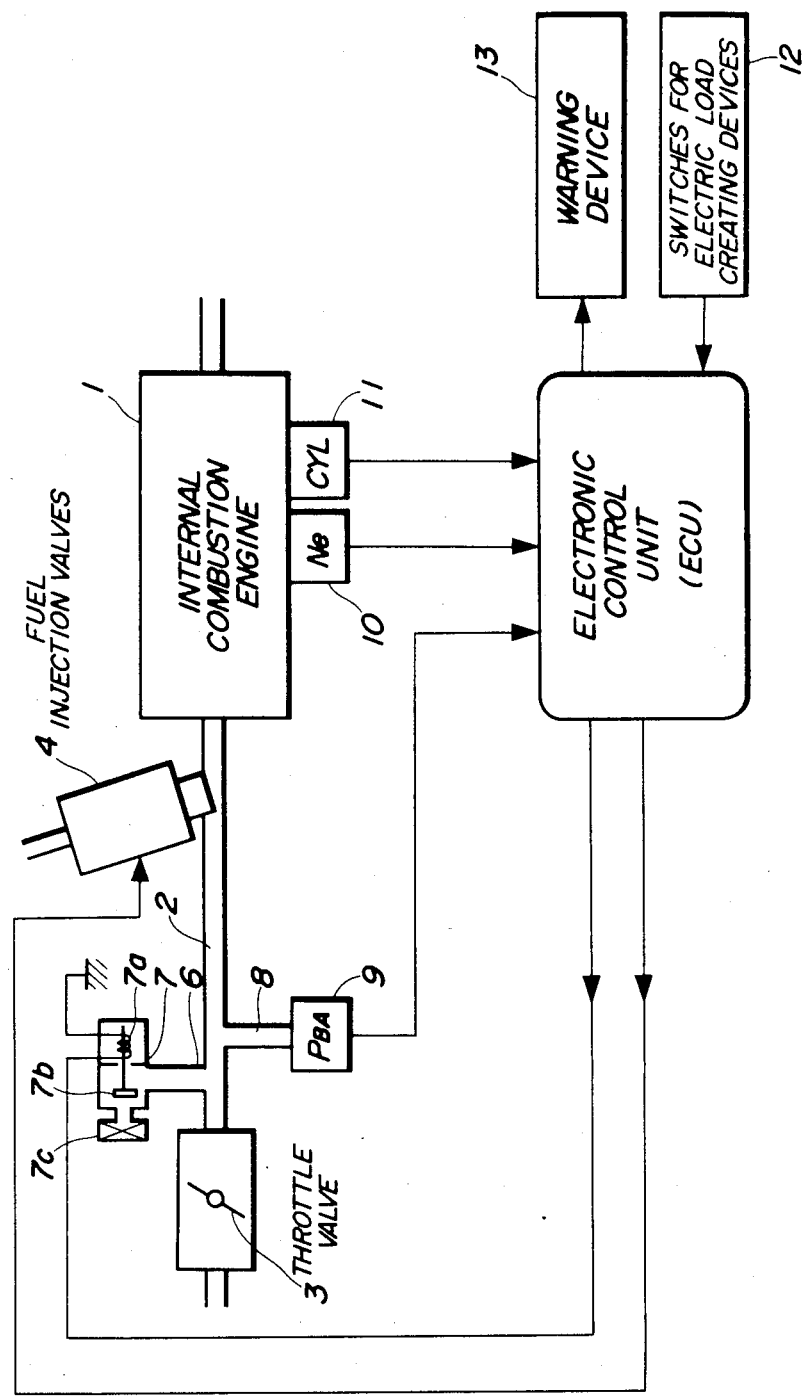
FIG. 1 is a schematic block diagram of the arrangement of a fuel supply control sytem combined with a multicylinder internal combustion engine, to which is applied the method according to the invention.

Referring first to FIG. 1, there is illustrated the whole arrangement of a fuel supply control system to which is applied the method according to the invention. Reference numeral 1 designates an internal combustion engine which is a multicylinder type, for instance, provided with four cylinders, to which is connected an intake pipe 2. A throttle valve 3 is arranged in the intake pipe.

Fuel injection valves 4 are provided in the intake pipe 2 at locations between the engine 1 and the throttle valve 3, each provided for each cylinder at a location slightly upstream of an intake valve, not shown, and each fuel injection valve 4 is connected to a fuel pump, not shown, and also electrically connected to an electronic control unit (hereinafter called "the ECU") 5 to have its valve opening period controlled by driving signals from the ECU 5.

On the other hand, a supplementary air flow rate control valve (hereinafter called "the control valve") 7 is connected to the intake pipe 2 via a pipe 6 at a location downstream of the throttle valve 3. This control valve 7 is of normally closed type, composed of a solenoid 7a and a valve 7b, the former being electrically connected to the ECU 5 and the latter being disposed to open upon energization of the solenoid 7a to make the pipe 6 communicate with an air cleaner 7c. This control valve 7 controls the flow rate of supplementary air supplied through the pipe 6 to the engine under the control of the ECU 5, so as to prevent a reduction in the engine rotational speed which occurs as the load on the engine 1 increases, for instance, headlights of an automotive vehicle on which the engine is installed are lit or an air conditioning system has started to operate at idling of the engine.

Connected via a pipe 8 to the intake pipe 2 at a location downstream of the control valve 7 is an absolute pressure sensor (hereinafter called "the PBA sensor") 9, which converts the absolute pressure in the pipe 8 into an electric signal to supply same to the ECU 5.

Also, an Ne sensor 10 and a CYL sensor 11 are arranged in facing relation to a camshaft or a crankshaft of the engine 1, neither of which is shown. The Ne sensor 10 is adapted to generate one pulse of a crank angle position signal, i.e., one TDC signal pulse, already referred to, each time the crankshaft assumes a crank angle position in advance of the top dead center (TDC) of each cylinder by a predetermined angle, at which the piston starts its suction stroke. The CYL sensor 11 is adapted to generate one CYL signal pulse, already referred to, each time the crankshaft assumes a predetermined crank angle position of a particular one of the cylinders. The pulses thus generated are supplied to the ECU 5.

Further connected to the ECU 5 are switches 12 for electric load creating devices such as headlights, so that signals indicative of on-off positions thereof are supplied to the ECU 5 from the respective switches 12.

Reference numeral 13 designages a warning device, which, as explained later, is adapted to give warning and/or indicate the abnormality, when the Ne detecting system is determined to be abnormal.

The ECU 5, as hereinafter described, determines whether or not there is abnormality in the manner the TDC signal pulses are generated by the Ne sensor 10, and also calculates, based on operation conditions of the engine, a fuel injection period Tout for the fuel injection valve 4, which is given by the following equation:

$$Tout = Ti \times K1 + K2 \quad (1)$$

where Ti is a basic fuel injection period, which is determined as a function of intake pipe absolute pressure PBA and engine rotational speed Ne, and K1 and K2 are correction coefficients and correction values, respectively, which are calculated in response to output signals from various sensors such as an engine cooling water temperature sensor by means of predetermined equations so as to optimize various characteristics of the engine such as startability, emission characteristics, fuel consumption, and accelerability.

The ECU 5 supplies driving signals to the fuel injection valves 4 to cause same to open either sequentially or simultaneously, with a duty ratio corresponding to the fuel injection period Tout determined as above, as explained later.

While the engine 1 is in an idling condition, the ECU 5 sets a desired idling rotational speed by the use of a predetermined equation as a function of engine operation parameters indicated by signals from the sensors which are also used to calculate the fuel injection period, and the ECU 5 also determines, in response to the difference between the set desired idle rotational speed and the actual engine rotational speed, a valve opening duty factor Dout for the control valve 7 and supplies the control valve 7 with a driving singal based on the valve opening duty factor Dout thus determined.

Figure 2:
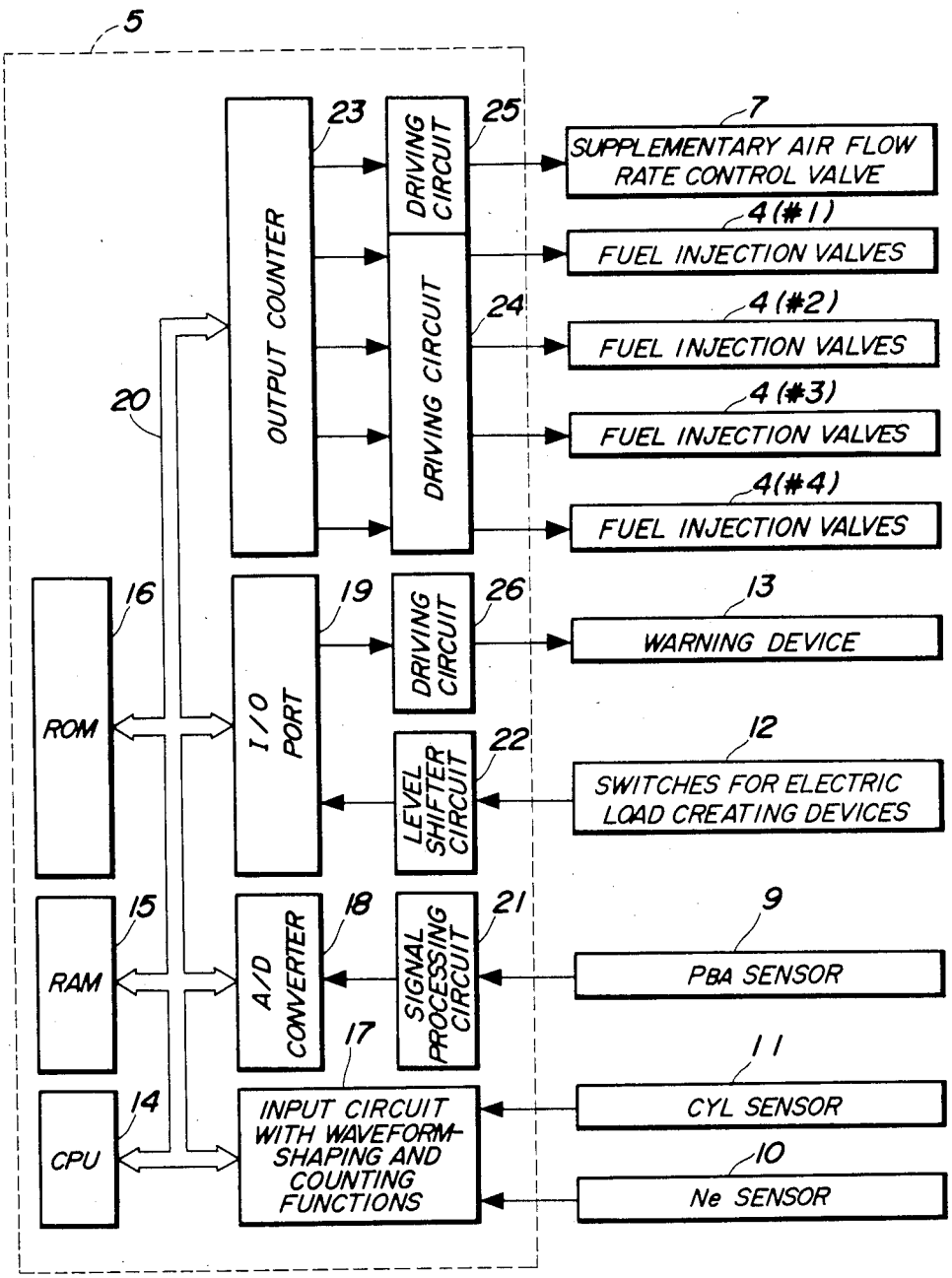
FIG. 2 is a block diagram of the internal arrangement of the ECU shown in FIG. 1.

FIG. 2 shows an electrical circuit within the ECU 5 in FIG. 1. In FIG. 2, a central processing unit (hereinafter called "the CPU") 14 is connected, via a bus 20 constituted by a data bus, an address bus, and a control bus, to a randam access memory (hereinafter called "the RAM") 15 for temporarily storing the results of various calculations from the CPU 14, a read only memory (hereinafter called "the ROM") 16 for storing programs for calculating the fuel injection period and the valve opening duty factor for the control valve 7 to be executed within the CPU 14, etc. an input circuit 17 provided with waveform-shaping and counting functions, an A/D converter 18, and an I/O port 19. The CPU 14 exchanges input and output data with the RAM 15, etc. by way of the bus 20.

The TDC signal pulses from the Ne sensor in FIG. 1 are supplied to the input circuit 17 which shapes the waveforms of the TDC signal pulses, supplies a single pulse signal as a TDC synchronous signal to the CPU 14 through the bus 20 upon inputting of each TDC signal pulse, and counts the interval of time Me between a preceeding pulse of the TDC signal and a present pulse of the same signal. This counted value Me is proportional to the reciprocal of the engine rotational speed Ne, and is supplied to the CPU 14 by way of the bus 20.

An output signal from the PBA sensor 9 in FIG. 1 has its voltage level shifted to a predetermined value by a signal processing circuit 21, and is then supplied to the A/D converter 18 to be converted thereby into a digital signal and supplied to the CPU 14. Signals indicative of on-off positions of the switches 12 for electric load creating devices have their voltage levels shifted to a predetermined value by a level shifter circuit 22 to be supplied to the CPU 14 through the I/O port 19.

In accordance with a control program stored in the ROM 16, the CPU 14 calculates the fuel injection period in a manner explained above, from the aforementioned various engine parameters and signals indicative of electric loads, and supplies an electric signal representing the calculated fuel injection period to an output counter 23, which is set thereby to a value corresponding to the calculated valve opening period for the fuel injection valves 4. Each time the output counter 23 receives a TDC signal pulse, it outputs a driving signal pulse to the corresponding fuel injection valve 4 through a driving circuit 24 to cause the fuel injection valve 4 to open for corresponding period of time to thereby effect fuel injection.

The input circuit 17 also shapes the waveforms of the CYL signal pulses from the CYL sensor 11 and supplies the shaped pulses to the CPU 14, wherein the signal pulses are used as an interrupt signal to execute determination of abnormality in the Ne detecting system, and also as a determination signal for determining the sequence in which the fuel injection valves 4 are actuated.

Each time the CPU 14 receives a TDC signal pulse from the Ne sensor 10, it calculates the valve opening duty factor for the control valve 7 on the basis of parameters used in calculation of the valve opening period for the fuel injection valves 4, and the resulting duty factor value to the output counter 23, to cause the driving circuit 24 to actuate the control valve 7 to open for a corresponding period of time to supply supplementary air to a corresponding one of the cylinders of the engine. When the Ne detecting system is determined to be abnormal, as explained later, the CPU 14 causes, through the I/O port 19 and a driving circuit 26, the warning device 13 to give warning, etc.

Figure 3:
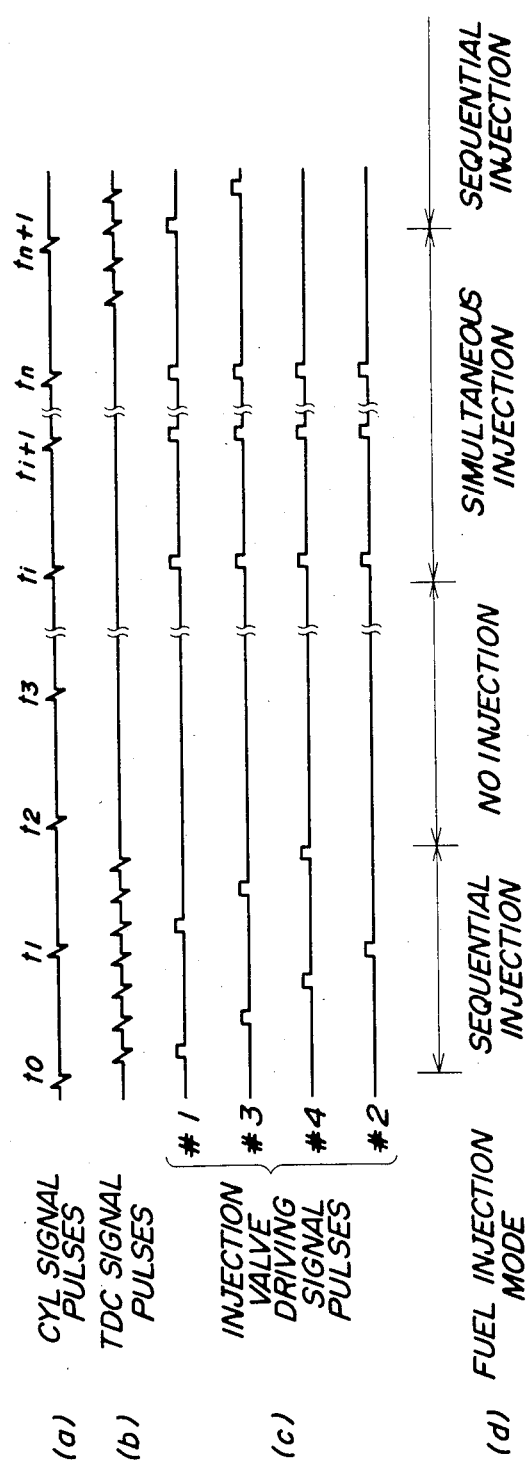
FIG. 3 is a timing chart showing a manner of generation of pulses of the CYL signal, the TDC signal, and fuel injection valve driving signals, useful in explaining the method of the invention.
Figure 4:
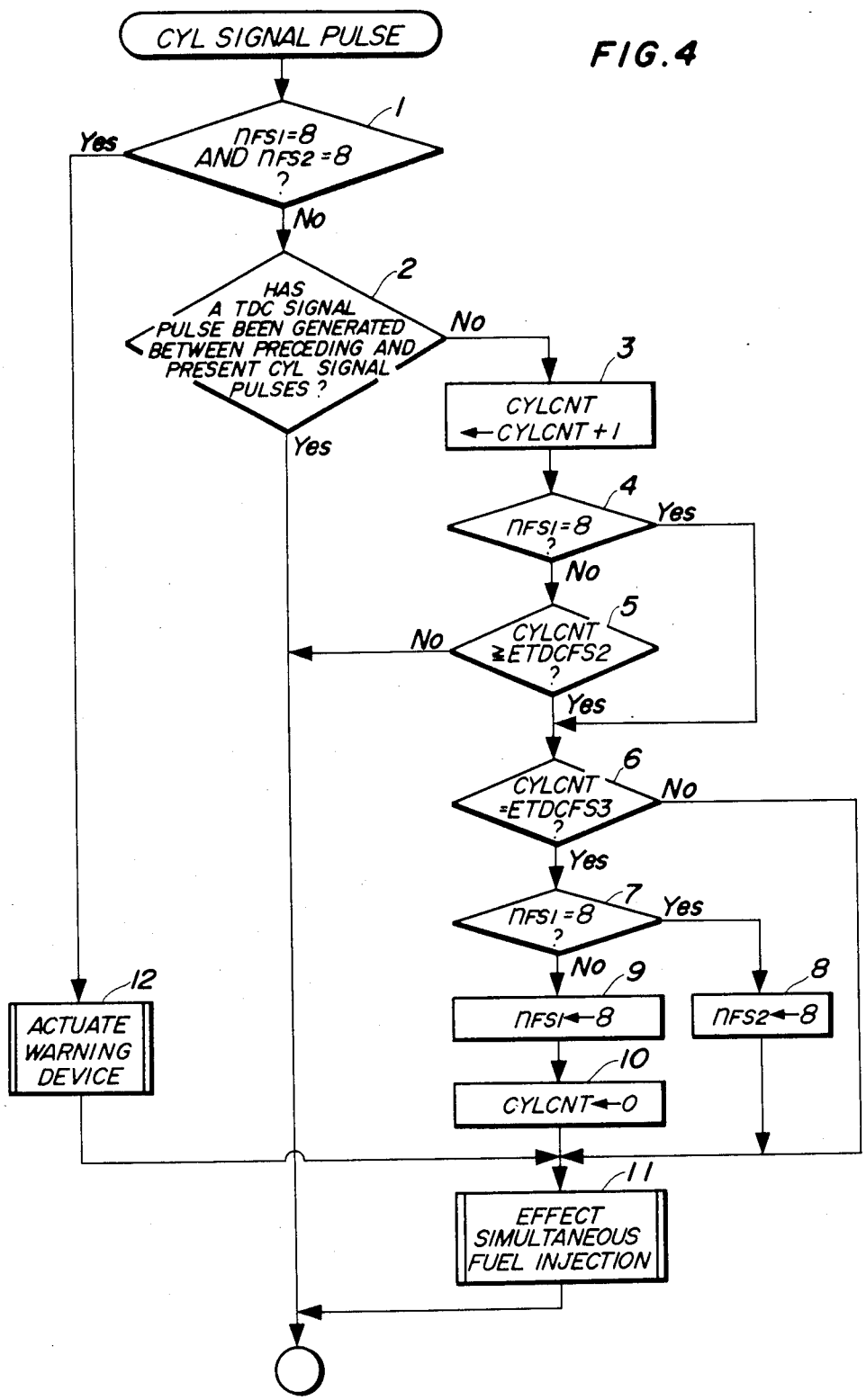
FIG. 4 is a flowchart showing a manner of determining abnormality in the engine rotational angle sensing system and a manner of executing fuel supply control in synchronism with generation of the CYL signal pulses.
Figure 5:
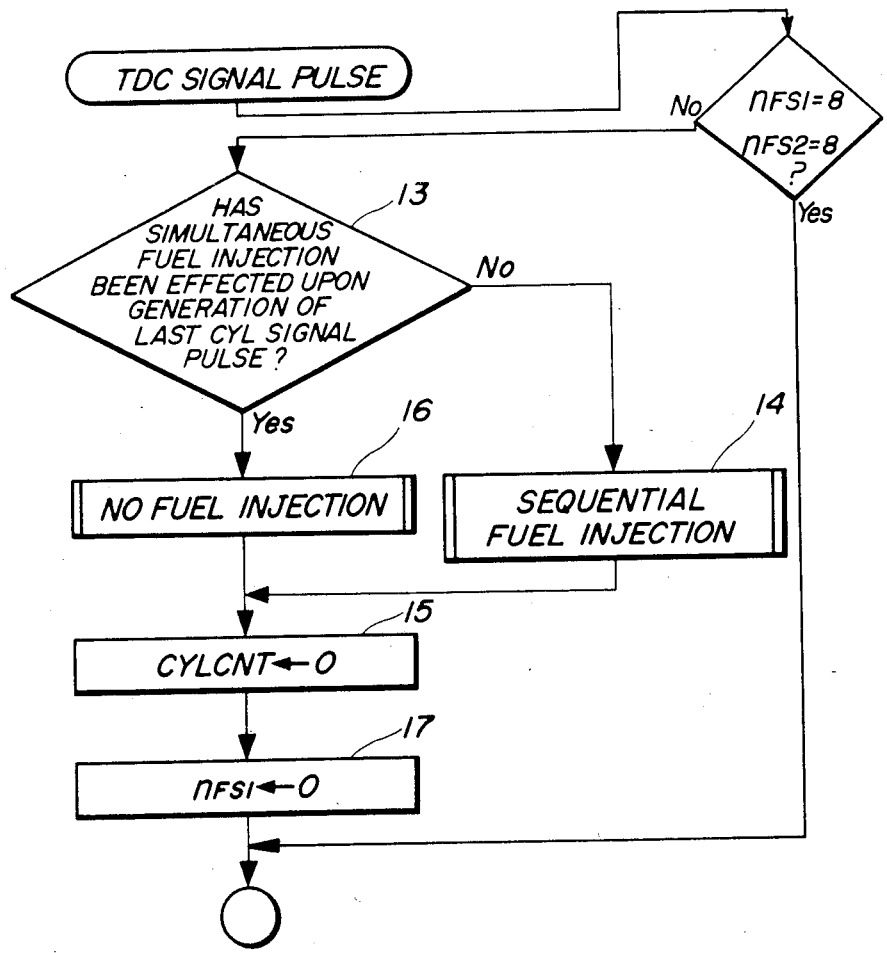
FIG. 5 is a flowchart showing a manner of executing fuel supply control in synchronism with generation of the TDC signal pulses.

Referring next to FIGS. 3 through 5, the method according to the invention will be explained. FIGS. 4 and 5 show a manner of detecting abnormality in the state of generation of the TDC signal pulses in the Ne detecting system, and a manner of controlling the fuel supply in the event of abnormality, which are executed within the ECU 5. The program of FIG. 4 is executed each time a CYL signal pulse from the CYL sensor 11 is inputted to the ECU 5, while the program of FIG. 5 is executed each time a TDC signal pulse from the Ne sensor 10 is inputted to the ECU 5.

Responsive to each CYL signal pulse, the ECU 5 determines whether or not first and second flags $\eta$Fs1 and $\eta$Fs2 for determining abnormality both assume a value "8" (step 1). The values for the flags $\eta$Fs1, $\eta$Fs2 are registered at predetermined addresses in the RAM 15. When the value "8" is written into the above addresses for the flags $\eta$Fs1, $\eta$Fs2, it is judged that the state of generation of the TDC signal in the Ne detecting system is abnormal. If the step 1 gives a negative answer, it is determined whether or not at least one TDC signal pulse has been generated between an immediately preceding pulse and a present pulse of the CYL signal (step 2). If the step 2 gives an affirmative answer (as is the case with the period between CYL signal pulses t0 and t1 as well as one between t1 and t2), it is determined that no abnormality exists in the Ne detecting system, and then the execution of the abnormality detecting program is terminated.

If it is determined that there is no abnormality in the Ne detecting system, the program shown in FIG. 5 is started by a first TDC signal pulse that is inputted to the ECU 5 immediately after this determination. First, it is determined at step 13 whether or not simultaneous fuel injection, explained later, has been effected upon generation of a last pulse of the CYL signal. This simultaneous fuel injection is effected only when the Ne detecting system is determined to be abnormal. Therefore, the answer at step 13 is negative, whereupon the program proceeds to step 14 to effect sequential fuel injections through the fuel injection valves 4 (as is effected between t0 and t1 in (c) of FIG. 3, as well as while the three subsequent TDC signal pulses are generated). Then a variable CYLCNT, as explained later, stored in the RAM 15 is reset to zero (step 15) and the first flag $\eta$Fs1 is also reset to zero (step 17) whereupon the program ends.

Reverting to FIG. 4, if the result at step 2 is negative, i.e., if no TDC signal pulse has been generated between the two consecutive CYL signal pulses (as is the case with the period between the CYL signal pulses t2 and t3 in FIG. 3), the number of the CYL signal pulses subsequently generated is counted and simultaneously the variable CYLCNT is incremented by one (step 3). Next, at step 4 it is determined whether or not the value of the flag $\eta$Fs1 is "8". If not, it is then determined whether or not the value CLYCNT is equal to or greater than a predetermined value ETDCFS2 (step 5). This predetermined value ETDCFS2 is set to a number, e.g. 2, equal to the number of the CYL signal pulses that are generated from the time it is first determined at step 2 that no TDC signal pulse has been generated (e.g. at the time the CYL signal pulse t3 is generated in (a) in FIG. 3) to the time no engine stalling can occur even if no simultaneous fuel injection is effected. If the result at step 5 is negative, there is then no fear of incurring engine stalling even if simultaneous fuel injection (explained later) is not effected as just stated, and the execution program ends, without effecting fuel injection into any cylinder (between the CYL signal pulses t2 and ti of (c) in FIG. 3). Incidentally, since no TDC signal pulse has been generated between the CYL signal pulses t2 and ti as shown at (a) in FIG. 3, the program of FIG. 5 is not executed, so that the sequential fuel injections executed at step 14 in FIG. 5 are naturally not effected.

If a CYL signal pulse ti at FIG. 3 (a) is generated without generation of any TDC signal pulse and the result at step 5 hence is affirmative, the program proceeds to step 6 where it is determined whether the variable CYLCNT is equal to a predetermined value ETDCFS3. The ETDCFS3 is set at 10, for instance. If the result at step 6 is negative, that is, if the number of CYL signal pulses generated from the time the sequential fuel injections are suspended due to no generation of TDC signal pulse, which would otherwise be effected at step 14 in FIG. 5, has not yet amounted to the predetermined value ETDCFS3, the program skips to step 11 whereat the simultaneous fuel injection is executed. At step 11 the valve opening period Tout is calculated by means of the equation (1) and the fuel injection valves 4 of the cylinders are opened at the same time for a period of time corresponding to the period Tout thus obtained (as is seen to happen at the time the CYL signal pulse ti is generated at FIG. 3 (c)), to inject the same amount of fuel into all of the cylinders. The simultaneous fuel injection of step 11 is effected at step 11 with the control valve 7 in FIG. 1 fully opened, that is, with the duty factor set to 100%. This can prevent engine stalling which is apt to occur when the engine 1 is operating at a low speed, such as idling, with the Ne detecting system abnormal.

If the result at step 6 is affirmative, it is determined whether or not the value of the first flag $\eta$Fs1 is "8" (step 7). If the number of the CYL signal pulses including the present one that have been generated since the detection of abnormality in the Ne detecting system is equal to the predetermined value ETDCFS3, e.g. 10, the determination is negative, and the program proceeds to step 9 to set the first flag $\eta$Fs1 to "8", and then the variable CYLCNT is set to "zero" at step 10, whereupon the simultaneous fuel injection is effected at step 11, followed by termination of the program.

So long as the abnormality in the Ne detecting system, i.e., the absence of the TDC signal pulses continues, the answer to step 4 will be always affirmative, because the first flag ηFs1 has been set to "8" at step 9, and therefore the program skips step 5 and proceeds to step 6. If the determination at step 6 is affirmative again, followed by an affirmative answer to 7, the program sets the second flag ηFs2 to "8" at step 8. When a next CYL signal pulse is inputted, the answer to step 1 becomes affirmative. This gives rise to final determination of abnormality in the Ne detecting system, whereupon the ECU actuates the warning device 13 (step 12) to give warning informing of the abnormality in the Ne detecting system and also indicate the location of the abnormality, e.g. by means of an indicator light formed of a plurality of light-emitting diodes, of which a predetermined one is let to emit light.

Thereafter, the first flag ηFs1 and the second flag ηFS2 both continue to assume "8" at step 1, and the warning device continues to be actuated at step 12, so that the simultaneous fuel injection is effected upon generation of each CYL signal pulse. According to the present embodiment, two flags are employed for abnormallity determination, namely ηFs1 and ηFs2, so that the Ne detecting system is to be determined to be abnormal only when both of the flags assume "8" at the same time, to thereby preclude the possibility of erroneous determination attributable to such factors as noise, and to obtain highly reliable determination.

If a TDC signal pulse is generated again before final determination of abnormality in the Ne detecting system is rendered at step 1 in FIG. 4, as is seen to happen between the CYL signal pulses tn and tn+1 at (a) and (b) in FIG. 3 (n<23 in this embodiment), the answer to step 13 in FIG. 5 which is executed upon generation of the same TDC signal pulse will be affirmative because a simultaneous fuel injection has been already effected at step 11 in FIG. 4 immediately upon the generation of the CYL signal pulse tn. As a result, no fuel injection synchronous with the TDC signal pulse is effected (step 16) and the variable CYLNT and the first flag ηFs1 are both reset to "zero" (steps 15 and 17). Then, in a loop started by a TDC signal pulse generated immediately following the CYL signal pulse tn+1, the answer to step 13 will be negative and hence the sequential fuel injections are effected at step 14.

Incidentally, as explained above, when the Ne detecting system is determined to be abnormal, the supplementary air flow rate control valve 7 is completely opened to thereby ensure stable engine operation during idling.

What is claimed is:

1. A method of injecting fuel into cylinders of a multi-cylinder internal combustion engine having cylinder-discriminating means for generating a pulse of a cylinder-discriminating signal each time a predetermined crank angle position of a particular one of said cylinders is assumed, and engine rotational angle sensing means for generating a pulse of a crank angle position signal each time a predetermined crank angle position of each of said cylinders is assumed, whereby a plurality of pulses of said crank angle position signal are generated between adjacent pulses of said cylinder-discriminating signal, in predetermined sequence starting with a predetermined cylinder corresponding to a first pulse of said crank angle position signal generated after each pulse of said cylinder-discriminating signal and in synchronism with pulses of said crank angle position signal, the method comprising the steps of:

determining whether or not a pulse of said crank angle position signal has been generated between an immediately preceding pulse and a present pulse of said cylinder-discriminating signal; and when it is determined that no pulse of said crank angle position signal has been generated between said immediately preceding pulse and said present pulse of said cylinder-discriminating signal, effecting simultaneous fuel injections into all the cylinders of said engine upon generation of said present pulse of said cylinder-discriminating signal.

2. A method as claimed in claim 1, wherein it is determined whether or not said simultaneous fuel injections have been effected consecutively a predetermined number of times, and said engine rotational angle sensing means is determined to be abnormal when said simultaneous fuel injections have been effected consecutively said predetermined number of times.

3. A method as claimed in claim 2, wherein once said engine rotational angle sensing means is determined to be abnormal, said simultaneous fuel injections are continued regardless of generation of subsequent pulses of said crank angle position signal.

4. A method as claimed in claim 2, including the steps of:

determining whether or not a pulse of said crank angle position signal has been generated between an immediately preceding pulse and a present pulse of said cylinder-discriminating signal, after execution of said simultaneous fuel injections and before final determination of abnormality in said rotational angle sensing means is rendered; and when said determination is affirmative, effecting said sequential fuel injections, starting with generation of a pulse of said crank angle position signal immediately following said present pulse of said cylinder-discriminating signal.

5. A method as claimed in claim 1, wherein said step of effecting simultaneous fuel injections is carried out when it is determined a predetermined number of times greater than 1 that no pulse of said crank angle position signal has been generated between said immediately preceding pulse and said present pulse of said cylinder-discriminating signal.

6. A method as claimed in claim 2, comprising the additional step of providing a warning indication when said engine rotational angle sensing means is determined to be abnormal.

* * * * *